United States Patent
Liao et al.

(10) Patent No.: US 6,788,365 B2
(45) Date of Patent: Sep. 7, 2004

(54) LIQUID CRYSTAL DISPLAY WITH SLANT STRUCTURES

(75) Inventors: Bing-Jei Liao, Pingtung (TW); Chung-Yuan Liu, Tainan (TW)

(73) Assignee: Himax Technologies, Inc., Tainan (TW)

( * ) Notice: Subject to any disclaimer, the term of this patent is extended or adjusted under 35 U.S.C. 154(b) by 0 days.

(21) Appl. No.: 10/322,250

(22) Filed: Dec. 17, 2002

(65) Prior Publication Data
US 2003/0112399 A1 Jun. 19, 2003

(30) Foreign Application Priority Data
Dec. 18, 2001 (TW) ........................................ 90131394 A (51) Int. Cl.[7] .............................................. G02F 1/13
(52) U.S. Cl. ...................................................... 349/113
(58) Field of Search ................................ 349/113, 129

(56) References Cited

U.S. PATENT DOCUMENTS 5,056,985 A * 10/1991 Johnson et al. ............. 414/694
6,188,457 B1 * 2/2001 Liu ............................. 349/124

FOREIGN PATENT DOCUMENTS

JP         11-326910        11/1999    ........... G02F/1/133

* cited by examiner

Primary Examiner—James A. Dudek
(74) Attorney, Agent, or Firm—Thomas, Kayden, Horstemeyer & Risley (57) ABSTRACT

A liquid crystal display (LCD) with slant structures is disclosed. The LCD includes a first plate, a second plate opposite to the first plate and a liquid crystal layer between the first plate and the second plate. The first plate further includes a first alignment film over the first plate and the first alignment film has an indication direction. The second plate includes a number of pixels. Each of the pixels includes the following from the bottom to the top: a pixel electrode, a reflector, a thin film layer consisting of a number of thin films, and a second alignment film. The thin films are formed by photolithography and the thin film layer and the second alignment film together form one slant structure with a single inclined side.

20 Claims, 6 Drawing Sheets

LIQUID CRYSTAL DISPLAY WITH SLANT STRUCTURES

This application incorporates by reference Taiwan application Serial No. 090131394, filed Dec. 18, 2001.

BACKGROUND OF THE INVENTION

1. Field of the Invention

The invention relates in general to the liquid crystal display (LCD) with slant structures, and more particular to the liquid crystal on Silicon (LCoS) with slant structures.

2. Description of the Related Art

LCoS with higher resolution is now highly demanded and becomes more popular because first, the markets of portable equipments, such as Personal Digital Assistance (PDA) and mobile phones, and the large size monitor, such as project television, are growing rapidly and also the higher image quality is demanded. The structure of the LCoS is different from the conventional LCD by using one silicon substrate and one glass substrate as its two opposite substrates. And liquid crystal molecules are then sandwiched between the two substrates.

Figure 1:
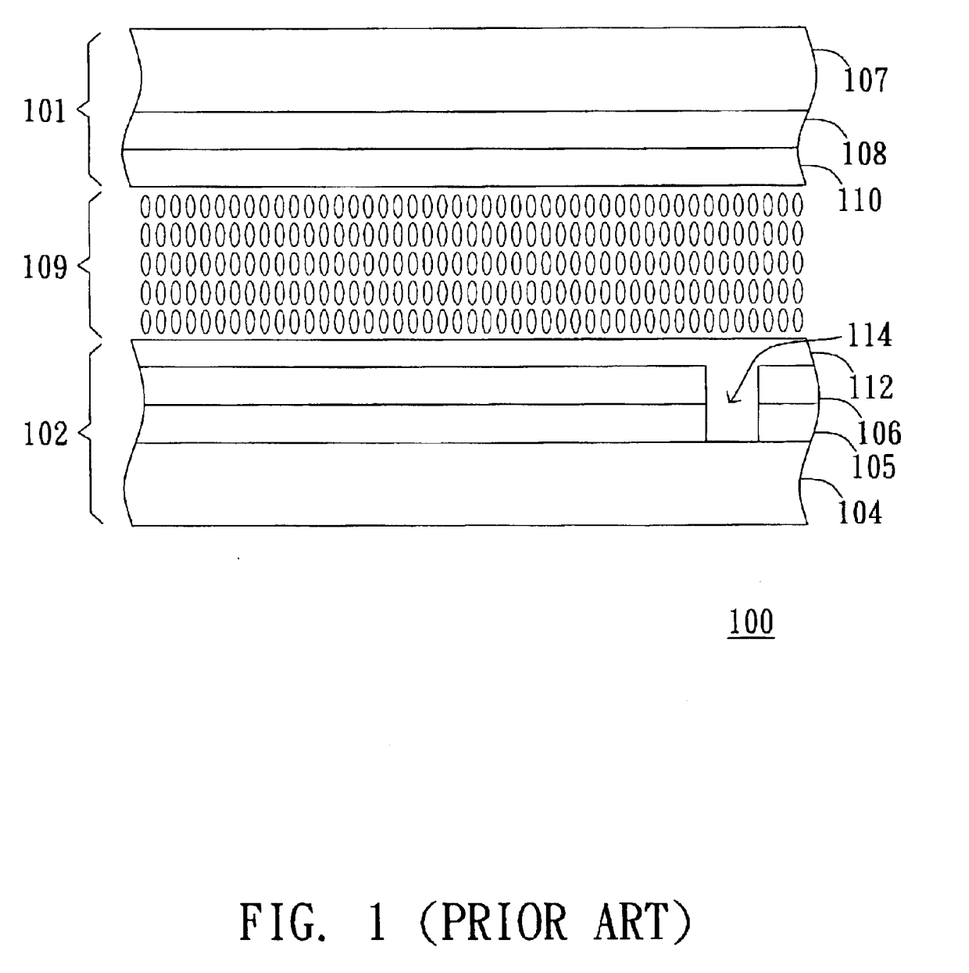
FIG. 1 (Prior Art) is the cross-sectional view showing a single pixel of a reflective LCoS.

In FIG. 1, the cross section of a single pixel 100 of a reflective LCoS is shown. The reflective LCoS has an upper plate 101 and a lower plate 102. The lower plate 102 comprises a silicon substrate 104. By using the semiconductor manufacturing process, devices such as the control circuit (not shown) of the pixel, the pixel electrode 105, the reflector 106 and so on are fabricated on the silicon substrate 104. The upper plate 101 of the LCoS comprises a glass substrate 107 and a transparent electrode 108 on the glass substrate 107 The upper plate 101 and the lower plate 102 are opposite to each other and there is a gap in-between. The liquid crystal molecules are filled in the gap to form a liquid crystal layer 109. Moreover, an alignment film 110 is formed over the upper plate 101 and another alignment film 112 is formed over the lower plate 102. The alignment films 110 and 112 control the orientation of the liquid crystal molecules. That is to say the liquid crystal molecules of the liquid crystal layer 109 orientate along the indication direction of the alignment films 110 and 112. On the LCoS panel, all the pixel electrodes 105 are not connected to each other and separated by slits 114. The slit 114 are either covered by alignment film 112 or filled with an insulating material.

Conventionally, the indication direction of alignment films is formed by rubbing. The rubbing process is performed by using special velvet cloth to rub the alignment film in a certain direction so that the alignment films 110 and 112 can have indication direction. However, it is difficult to always precisely match the special velvet cloth and the alignment film. The deviation of the special velvet cloth during the rubbing process can cause the unevenness of the alignment films. Also, electrostatic discharge generated during the rubbing process can influence the operation of the electric devices and the orientation of the liquid crystal molecules. Furthermore, the remaining residues can scratch the alignment films 110 and 112.

In addition to rubbing process, other methods such as photo-align is also available. However, it is not mature enough to be applied in large-scale.

Moreover, while a voltage is applied to the transparent electrode 108 of the upper plate 101 and the pixel electrode 105 of the lower plate 102, the orientation of the liquid crystal molecules in the liquid crystal layer 109 will change and consequently the light transmissivity of the liquid crystal molecules will also change. In other words, the orientation of the liquid crystal molecules in the pixels and the brightness of the pixels can be controlled by the applied voltage. However, to show a complete image, the brightness and the applied voltage of each pixel are not equal. A transverse electric field exists at two the edge of every two adjacent pixels with unequal applied voltage. The strength of the transverse electric field and the difference of the applied voltage of two adjacent pixels are in direct proportion. As a result of the transverse electric field, the brightness of the edge of pixels may deviate from expectation and even dark bands may exist on the image. This is so-called fringe effect. Therefore, it is a hot issue to eliminate the fringe effect in order to produce better image.

SUMMARY OF THE INVENTION

It is therefore an object of the invention to provide an LCD with slant structures with the following advantages:

1. using an alternative process without the drawbacks of rubbing; and
2. having reduced transverse electric field and no fringe effect.

The invention achieves the above-identified objects by providing an LCD including a first plate, a second plate opposite to the first plate and a liquid crystal layer between the first plate and the second plate. The first plate further includes a first alignment film over the first plate and the first alignment film has an indication direction. The second plate includes a number of pixels. Each of the pixels includes the following from the bottom to the top: a pixel electrode, a reflector, a thin film layer consisting of a number of thin films, and a second alignment film. The thin films are formed by photolithography and the thin film layer and the second alignment film together form one slant structure with a single inclined side.

DETAILED DESCRIPTION OF THE INVENTION

The spirit of the invention focuses on applying the photolithography manufacturing process to form a plurality of thin films on the lower plate. These thin films together with the alignment film combine to form a thin film layer, which are configured as slant structures. By this figure, no indication direction formed by rubbing is needed to be formed on the alignment film on the lower plate, the transverse electric field is obstructed and the fringe effect is diminished.

Figure 2:
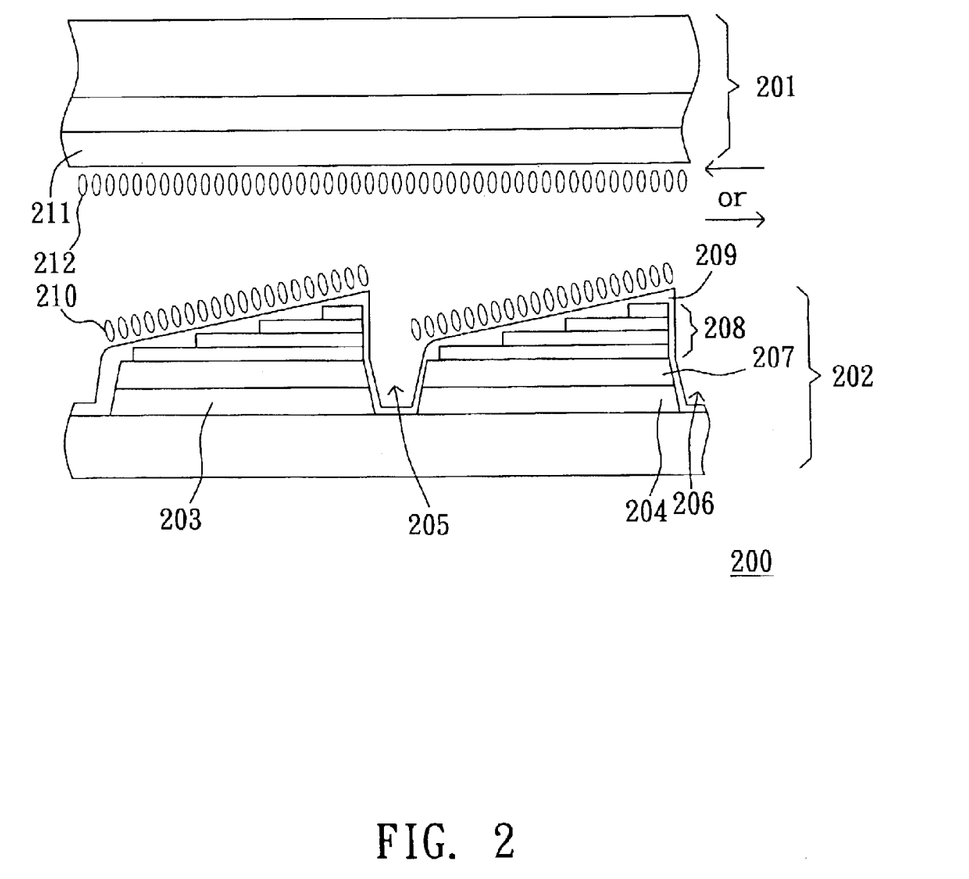
FIG. 2 shows a Vertical Alignment (VA) mode liquid crystal on Silicon (LCoS) panel according to a preferred embodiment of the invention.

Referring to FIG. 2, a Vertical Alignment (VA) mode liquid crystal on Silicon (LCoS) panel 200 according to a preferred embodiment of the invention is shown. On the lower plate 202, two adjacent pixel electrodes 203 and 204 are separated bye slit 205 or the insulating material filled in the slit 205. Over the pixel electrode 203 and the pixel electrode 204, a reflector 207 is formed. In this invention, before the alignment film 209 is manufactured on the reflector 207, a number of thin films are sequentially formed on the top surface of the lower plate 202 by semiconductor photolithography manufacturing process. The sequentially formed thin films then combine to form a thin film layer 208. The material of each of the thin film is silicon dioxide. Taking the thin film layer 208 covering the pixel electrode 204 as an example, each thin film is arranged over the pixel electrode 204. The lower thin film, (i.e. the thin film which is closer to the lower plate 202), is always longer than the upper thin film, (i.e. the thin film which is less close to the lower plate 202) and all of the thin films are aligned to each other at one end and are also aligned to the edge of the slit 206. Consequently, the desired stair-like slant structure of the thin film layer 208 is formed on the pixel electrode 204, as shown in FIG. 2.

Then, an alignment film 209 is formed over the lower plate 202, covering the pixel electrodes 203, 204, the reflector 207, the slit 205, the slit 206 and the thin film layer 208. One of the advantages of the slant structures of the invention is that no indication direction of the alignment film 209 is needed to be formed by rubbing. Thus, the manufacturing process is simplified. Disadvantages caused by the conventional rubbing process, such as unevenness, electrostatic discharge, and scratch of the alignment film 209 due to residues remaining on the lower plate 202, can be avoided. Further more, the thin film layer is fabricated by the conventional photolithography process. Equipments therefore are widely applied in the semiconductor manufacturing process. Thus, a better performance can be obtained without further equipment investment.

Because of the stair-like thin film layer 208, the alignment film 209 forms as at least one slanted structure, as shown in FIG. 2. The angle of inclination of the alignment film 209 depends on the number and the thickness of the thin film, and length difference between each thin film 208. For example, an alignment film 209 with a larger angle of inclination can be obtained by using a larger number of thick thin films.

An alignment film 211 with an indication direction, such as perpendicular to the major axis of the slit 205 and slit 206, is formed on the upper plate 201. Then, liquid crystal molecules 210, 212 are sandwiched between the upper plate 201 and the lower plate 202. The liquid crystal molecules 210 sense the way the alignment film 209 are orientated and arrange perpendicular to the alignment film 209. Also, because the slant structure of the alignment film 209, the liquid crystal molecules 210 are not perpendicular to the lower plate 202 but with pretilt angle. The surface of the alignment film is manufactured to be smooth and uniform so that liquid crystal molecules 210 near the side of the alignment film 209 have equal pretilt angles, as shown in FIG. 2. The degree of the pretilt angle of the liquid crystal molecules 210 is determined by the slop of the slant structure of the thin film layer 208.

Figure 3A:
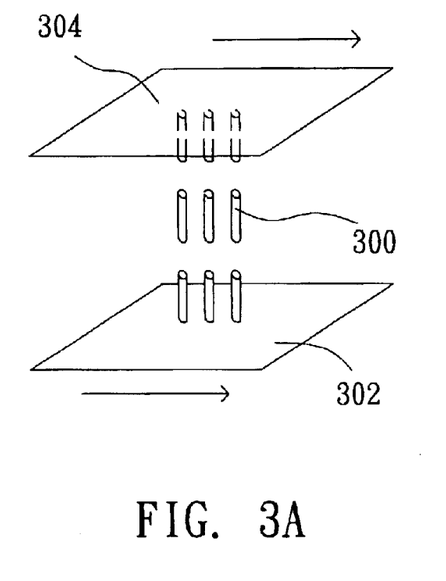
FIG. 3A and FIG. 3B show the arrangements of the liquid crystal molecules of a VA mode liquid crystal display Panel while the voltage is applied and while no voltage is applied.
Figure 3B:
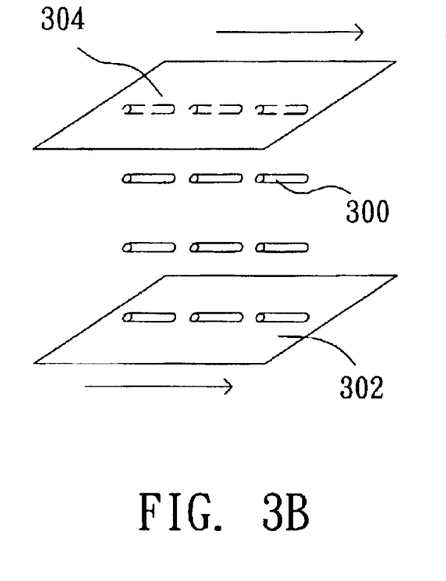

FIG. 3A and FIG. 3B show the arrangements of the liquid crystal molecules of a VA mode liquid crystal display Panel while the voltage is applied and while no voltage is applied. FIG. 3A shows the passive state, while the voltage is applied and FIG. 3B shows the active state, while no voltage is applied. Spacings on the lower plate and the slant structure of the alignment film are not shown in FIG. 3A and FIG. 3B. The indication direction of the alignment film 304 on the upper plate is indicated by arrow. In FIG. 3A, while no voltage is applied, most of the liquid crystal molecules 300 are perpendicular to both the upper plate and the lower plate, except that few liquid crystal molecules 300 near the alignment film 302 are perpendicular to the alignment film 302 and form a pretilt angle to the lower plate. Therefore, at the passive state while the voltage is applied, the liquid crystal molecules 300 have low light transmissivity and the pixels are dark. In FIG. 3B, while enough voltage is applied, most of the liquid crystal molecules 300 will be influenced by the liquid crystal molecules near the lower plate with a pretilt angle and orientate for 90 degree to be parallel to both the upper plate and the lower plate. Therefore, the liquid crystal molecules 300 have high light transmissivity and full brightness.

Figure 4:
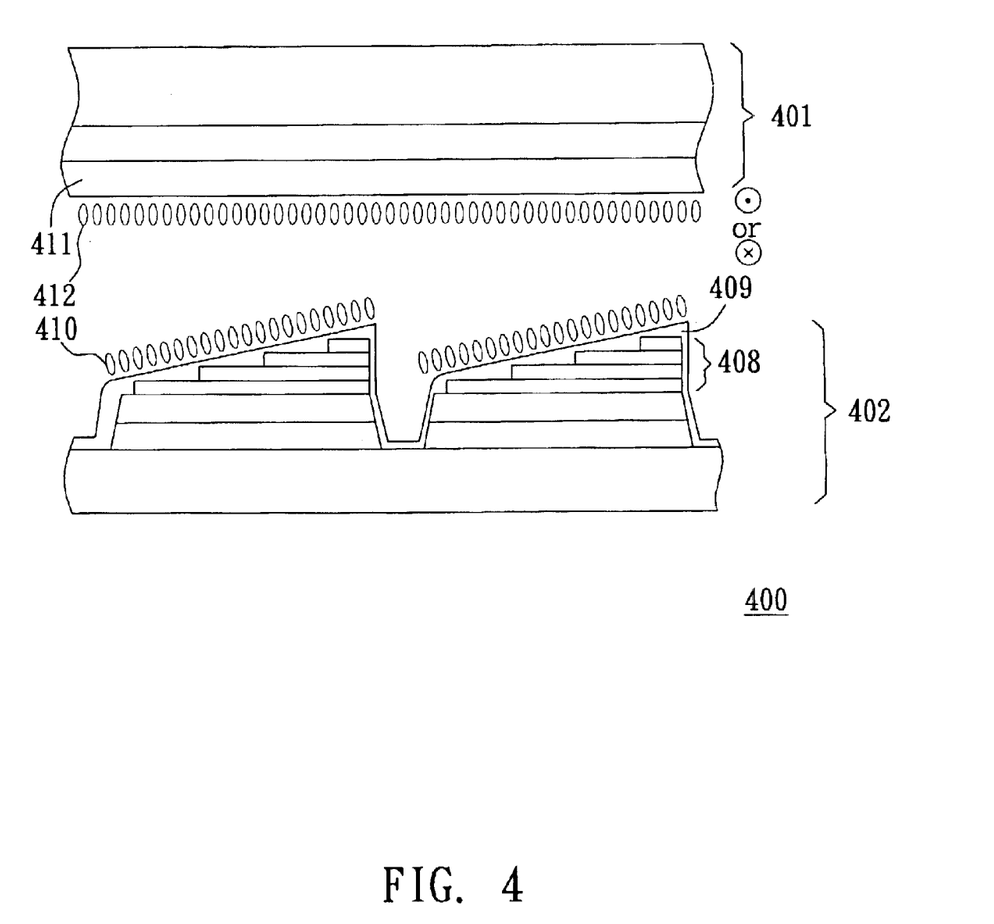
FIG. 4 shows the cross section of an inverse Twisted Nematic (Inverse TN) mode LCoS panel according to the second referred embodiment of the invention.

FIG. 4 shows the cross section of an inverse Twisted Nematic (Inverse TN) mode LCoS panel 400 according to the second referred embodiment of the invention. Similar to the VA mode LCoS panel 200 according to the first preferred embodiment of the invention, by photolithography, a number of thin films 408 with different lengths are sequentially formed on the surface of the lower plate 402 and form a stair-like structure. An alignment film 409 is then formed over the thin films 408. The alignment film 409 covering the stair-like structure thin films 408 has an indication direction but no rubbing process is needed. The advantages of the slant structure of the thin films 408 and the alignment film 409 are the same as what have been mentioned so that it is not necessary to repeat herein.

As to the manufacturing of the upper plate 401, an alignment film 411 with another indication direction is needed to form on the surface of the upper plate 401. What is different from the VA mode LCoS panel is that the indication direction of the alignment film 411 is parallel to the major axis of the slit. The direction of the indication direction of the alignment film 411 is either vertically coming out from the paper (indicated by ⊙) or vertically going in the paper (indicated by ⊕).

Then, liquid crystal molecules 410, 412 are sandwiched between the upper plate 401 and the lower plate 402. The liquid crystal molecules near the alignment film 409 are arranged in an order perpendicular to the alignment film 409. Because the alignment film 409 is a slant structure, the liquid crystal molecules near and perpendicular to the alignment film 409 form a pretilt angle. The degree of the pretilt angle of the liquid crystal molecules 410 is determined by the slop of the slant structure of the alignment film 409.

Figure 5A:
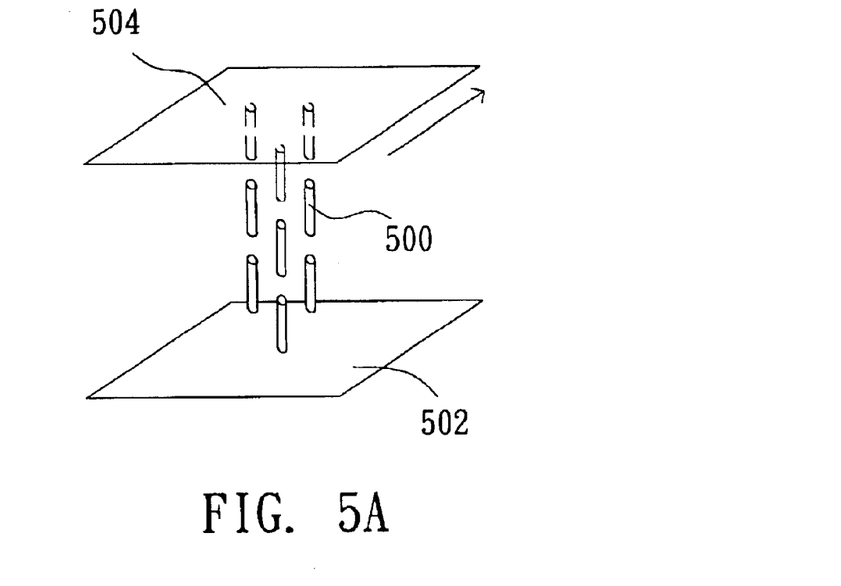
FIG. 5A and FIG. 5B show the arrangements of the liquid crystal molecules of an inverse TN mode liquid crystal display Panel while the voltage is applied and while no voltage is applied.
Figure 5B:
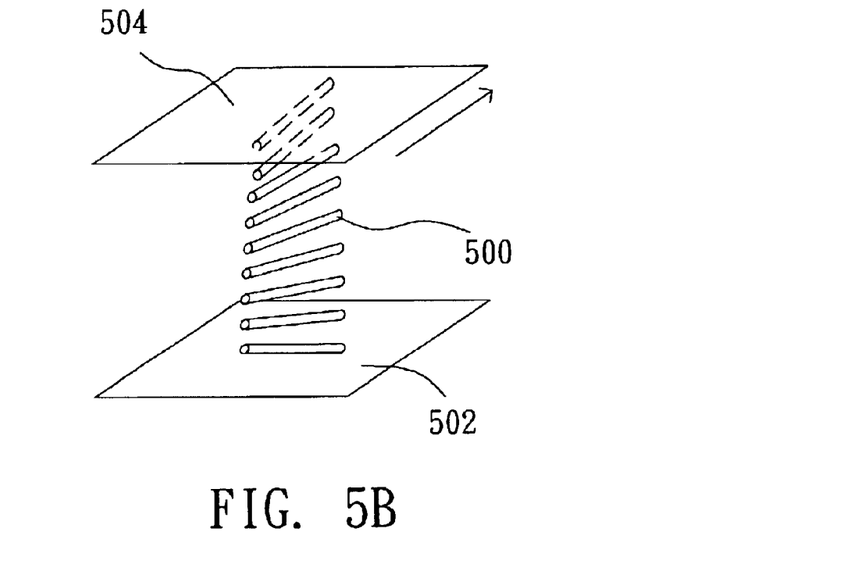

FIG. 5A and FIG. 5B show the arrangements of the liquid crystal molecules of an inverse TN mode liquid crystal display Panel while the voltage is applied and while no voltage is applied. Spacings on the lower plate and the slant structure of the alignment film are not shown in FIG. 5A and FIG. 5B. The indication direction of the alignment film 504 on the upper plate is indicated by arrow. As shown in FIG. 5A, while no voltage is applied, the majority of the liquid crystal molecules 500 are perpendicular to both of the upper plate and the lower plate, except that few liquid crystal molecules near and perpendicular to the alignment film on the lower plate. Therefore, the liquid crystal molecules 500 have low light transmissivity and full brightness. On the other hand, as shown in FIG. 5B, while an enough voltage is applied, liquid crystal molecules near the alignment film 502 on the lower plate have a pretilt angle, the liquid crystal molecules adjacent to the alignment film 504 on the upper plate orientate along the indication direction and the liquid crystal molecules in-between twist for 90 degree. Therefore, the liquid crystal molecules 500 have high light transmissivity and full brightness.

The formation of stair-like thin films and the alignment film with slant structure induce the pretilt angle of the liquid crystal molecules, which is one of the main advantages of the invention, regardless of the VA mode or the inverse TN mode liquid crystal display panel. However, a further advantage of the invention is the reducing of the fringe effect. Because of the barrier of the stair-like thin films and the alignment film with slant structure, the transverse electric field, which is caused by the unequal voltage between two pixels, is greatly reduced. Consequently, the liquid crystal molecules can arrange in a much evener order and the image quality of the liquid crystal display panel is highly improved.

Figure 6:
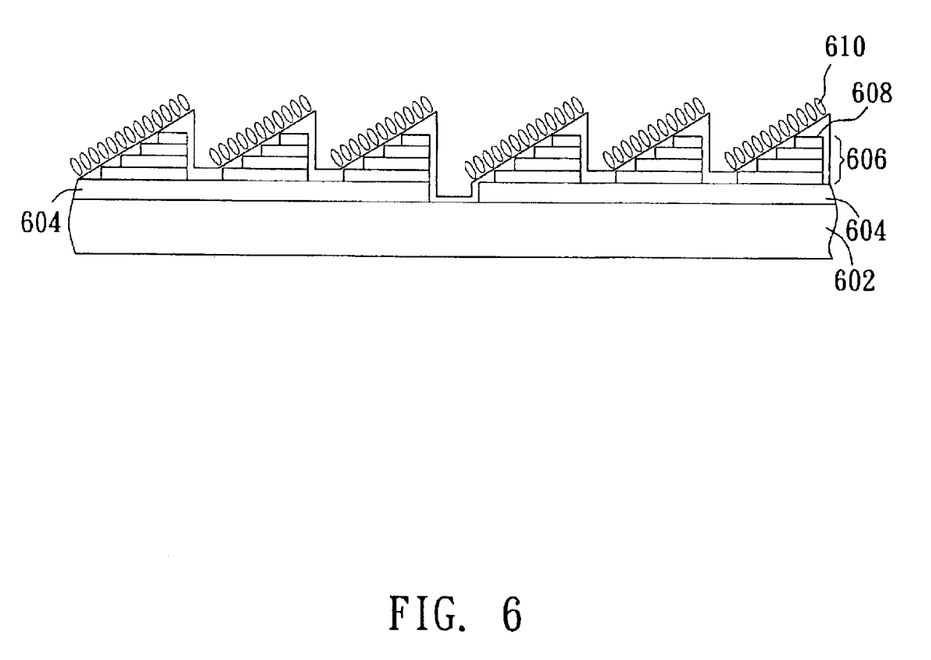
FIG. 6 shows a cross section of a lower plate of a LCD, having slant structures.

The invention is not limited to be implemented in the LCoS but can be applied in any general liquid crystal display (LCD). As shown in FIG. 6, a cross section of a lower plate of a LCD, having slant structures, is shown. The main difference between the LCD and the LCoS is that the lower plate 602 of the LCD is a glass substrate and the lower plate of the LCoS is a silicon substrate. The pixel electrode 604 of each pixel is formed on the glass substrate individually and there is no slit between pixel electrodes. According to the spirit of the invention, stair-like thin films 606 are formed on the pixel electrode 604 by photolithography. The characters and the manufacturing process are similar to what have been mentioned, so they will not be repeated herein. Then, an alignment film 608 is formed over the stair-like thin films. No rubbing process is needed to form the indication direction of the alignment film 608. The thin films 606 and the alignment film 608 then together form at least a slant structure. The advantages of the slant structure are previously stated. What is needed to be notified is that each pixel electrode 604 can include more than one slant structures as shown in FIG. 6.

To sum up, the slant structures of the liquid crystal display according to the invention are manufactured by first forming a plurality of thin films with different length on the lower plate, by using photolithography, and forming an alignment film over the thin films. The alignment film and the thin films together form the slant structure. Consequently, the alignment film has an indication direction without the process of rubbing and the liquid crystal molecules near the alignment film on the lower plate have a pretilt angle. Furthermore, the slant structures can obstruct the transverse electric field between pixel electrodes and eliminate the fringe effect.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) with slant structures, comprising:
   a first plate, including
      a first alignment film over the first plate, wherein the first alignment film has an indication direction, and wherein liquid crystal molecules near the surface of the alignment film arrange according to the indication direction;
   a second plate opposite to first plate, including
      a plurality of pixels, wherein each of the pixels includes
         a pixel electrode;
         a reflector on the pixel electrode; and
         a thin film layer on the reflector, wherein the thin film layer includes a plurality of thin films; and
      a second alignment film on the pixels, wherein the thin film layer and the second alignment film on one of the pixels forming one slant structure; and
   a liquid crystal layer including a plurality of liquid crystal molecules sandwiched between the first plate and the second plate.

2. The liquid crystal display as claimed in claim 1, wherein the thin films are formed on the second plate by photolithography.

3. The liquid crystal display as claimed in claim 1, wherein each of the thin films is aligned to each other at one side.

4. The liquid crystal display as claimed in claim 1, wherein the thin films comprise a first thin film and a second thin film, and wherein a distance between the first thin film and the second plate is smaller than a distance between the second thin film and the second plate and the first thin film is longer than the second thin film.

5. The liquid crystal display as claimed in claim 1, wherein a material of the thin films comprises silicon dioxide.

6. The liquid crystal display as claimed in claim 1, wherein the liquid crystal display is a liquid crystal on silicon (LCoS) panel and the second plate comprises a silicon substrate.

7. The liquid crystal display as claimed in claim 6, wherein the pixel electrodes of the pixels are separated from each other by a slit.

8. The liquid crystal display as claimed in claim 7, wherein one side of each of the thin films is aligned to an edge of the slit.

9. The liquid crystal display as claimed in claim 7, wherein the second alignment film is formed over the pixels and the slit.

10. The liquid crystal display as claimed in claim 7, wherein the slit is filled with an insulating material.

11. The liquid crystal display as claimed in claim 7, wherein a major axis of the slit is perpendicular to the indication direction and the LCoS panel is a Vertical Alignment mode (VA) LCoS panel.

12. The liquid crystal display as claimed in claim 7, wherein a major axis of the slit is parallel to the indication direction and the LCoS panel is an inverse Twisted Nematic (inverse TN) mode LCoS panel.

13. A liquid crystal display (LCD) with slant structures, comprising:
   a first plate, including
      a first alignment film over the first plate, wherein the first alignment film has an indication direction, and wherein liquid crystal molecules near the surface of the alignment film arrange according to the indication direction;
   a second plate opposite to the first plate, including
      a plurality of pixels, wherein each of the pixels includes
         a pixel electrode;
         a reflector on the pixel electrode; and
         a thin film layer on the reflector, wherein the thin film layer includes a plurality of thin films; and
      a second alignment film on the pixels, wherein the thin film layer and the second alignment film on one of the pixels forming one slant structure with a single incline side; and a liquid crystal layer including a plurality of liquid crystal molecules sandwiched between the first plate and the second plate.

14. The liquid crystal display as claimed in claim 13, wherein each of the thin films is aligned to each other at one side.

15. The liquid crystal display as claimed in claim 14, wherein the thin film layer has a stair-like side.

16. The liquid crystal display as claimed in claim 15, wherein the thin films comprise a first thin film and a second thin film, and wherein a distance between the first thin film and the second plate is smaller than a distance between the second thin film and the second plate and the first thin film is longer than the second thin film.

17. The liquid crystal display as claimed in claim 13, wherein the pixel electrodes of the pixels are separated from each other by a slit.

18. The liquid crystal display as claimed in claim 17, wherein one side of each of the thin films is aligned to an edge of the slit.

19. The liquid crystal display as claimed in claim 17, wherein the second alignment film is formed over the pixels and the slit.

20. The liquid crystal display as claimed in claim 17, wherein the slit is filled with an insulating material.

* * * * *